US012789215B2

(12) United States Patent
Pitaud

(10) Patent No.: US 12,789,215 B2
(45) Date of Patent: Nov. 10, 2026

(54) MULTIPLE NOZZLE HOLDER FOR AGRICULTURAL SPRAY SYSTEM

(71) Applicant: EXEL INDUSTRIES, Epernay (FR)

(72) Inventor: Sylvain Pitaud, Chaneins (FR)

(73) Assignee: EXEL INDUSTRIES, Epernay (FR)

( * ) Notice: Subject to any disclaimer, the term of this patent is extended or adjusted under 35 U.S.C. 154(b) by 278 days.

(21) Appl. No.: 18/538,636

(22) Filed: Dec. 13, 2023

(65) Prior Publication Data

US 2024/0198365 A1 Jun. 20, 2024

(30) Foreign Application Priority Data

Dec. 19, 2022 (FR) ...................................... 2213888

(51) Int. Cl.
*F16K 31/524* (2006.01)
*B05B 1/16* (2006.01)
*F16K 11/16* (2006.01)

(52) U.S. Cl.
CPC ...... *F16K 31/52416* (2013.01); *B05B 1/1609* (2013.01); *B05B 1/1672* (2013.01); *F16K 11/165* (2013.01); *F16K 31/5245* (2013.01); *F16K 11/166* (2013.01)

(58) Field of Classification Search
CPC ............. F16K 31/52416; F16K 11/166; F16K 31/52425; F16K 11/165; B05B 1/1672
See application file for complete search history.

(56) References Cited

U.S. PATENT DOCUMENTS 6,036,107 A * 3/2000 Aspen .................. B05B 9/0423 137/884
2012/0279462 A1* 11/2012 Warnery ................ F01P 7/167 137/554
2013/0168473 A1 7/2013 Langkamp
2015/0367358 A1* 12/2015 Funseth ................ A01G 25/16 239/562
2025/0314514 A1* 10/2025 Steinhauser ........ B05C 11/1036

FOREIGN PATENT DOCUMENTS

EP 1821017 A2 8/2007
EP 2801410 B1 10/2018
EP 3542906 B1 12/2021
WO 2014067785 A1 5/2014

OTHER PUBLICATIONS

Search Report from the French Intellectual Property Office on corresponding FR application (FR2213888) dated Jul. 7, 2023.

* cited by examiner

*Primary Examiner* — Gerald L Sung
*Assistant Examiner* — Alyson Joan Harrington
(74) *Attorney, Agent, or Firm* — Alumen IP Law PC

(57) ABSTRACT

The present invention is directed to a nozzle holder, having a body, a dispensing chamber, a plurality of valves in the dispensing chamber, movable between an open and closed position, a rotationally movable plate in contact with a first end contact surface of each valve to control the movement of said valve between its two positions; wherein the peripheral edge of the plate has high and low edge portions, in the opening position of a valve, the first end contact surface is in contact with a first plate edge portion, and in the closing position, the first end contact surface of the valve is in contact with a second plate edge, the second edge being different from the first edge.

10 Claims, 15 Drawing Sheets

MULTIPLE NOZZLE HOLDER FOR AGRICULTURAL SPRAY SYSTEM

TECHNICAL FIELD

The present invention relates to the field of agricultural spray systems. More precisely, the invention relates to spray devices, especially comprising multiple nozzle holders, that is, carrying a plurality of spray nozzles.

BACKGROUND

An agricultural spray boom generally comprises nozzle holders evenly distributed over the entire length of the spray boom, to spray plant protection product in liquid form onto rows of plants. To improve the efficiency of the product spraying, it is necessary to vary the spraying flow rate of the nozzles and to control it proportionally to the forward speed of the agricultural machine supporting the spraying boom and/or depending on the product sprayed, for example. To address this problem, nozzle holders supporting several nozzles are known, for example different nozzles or nozzles with different flow rates.

When a user wants to change the nozzle, he/she has to perform an operation, generally manual, to turn the nozzle holder and thus activate another nozzle adapted to a different forward speed of the agricultural machine. This operation requires an interruption of spraying, in favor of an operation of modifying the active nozzles on each of the nozzle holders. Thus, nozzle holders comprising a plurality of nozzles which can be active simultaneously, and having an identical or non-identical flow rate are known. These nozzle holders are generally controlled automatically through an electric actuator, enabling the active nozzle(s) to be selected by means of a device for selecting active nozzles. Document EP 2801410 B1 describes such an example of a nozzle holder comprising a plurality of nozzles, comprising a main body, a dispensing chamber, and a plurality of valves configured to leave open or to close corresponding ports to the plurality of nozzles.

However, such nozzle holders have the major drawback of having the entire activated nozzle selection mechanism immersed in the fluid dispensed by the spray device. Thus, when spraying a plant protection product, the product is in contact with mechanical components which may pollute said product before spraying. Conversely, contact with a fluid that may comprise chemical agents, for example corrosives, is detrimental to the service life of the device and is incompatible with a need for lubrication of the movable mechanical elements, thereby also reducing their service life. Furthermore, in this configuration, the entire device has to be sealed, all of these restrictions limiting the choice of materials usable for the manufacture of the nozzle holder.

The invention is intended to solve the drawbacks of the state of the art, especially by providing a nozzle holder comprising a plurality of nozzles which can be active simultaneously, wherein the number of mechanical components in contact with the fluid is limited.

SUMMARY OF THE INVENTION

More precisely, one object of the invention is a nozzle holder, especially for an agricultural sprayer, comprising:

- a body housing a liquid inlet duct configured to be supplied with liquid by a liquid supply line;
- a peripheral dispensing chamber of the body supplied with liquid by the inlet duct and communicating with a plurality of liquid outlet ducts, the interfaces between the dispensing chamber and each of the liquid outlet ducts delimiting liquid through ports of the dispensing chamber, each of said outlet ducts leading to a spray head;
- a plurality of valves partially arranged in the dispensing chamber, each of said valves being movable between a sealed closing position of the corresponding liquid through port of the dispensing chamber and an opening position of said through port of the dispensing chamber;
- a circular plate rotationally movable relative to the body and housed in a mechanism compartment of the body having a peripheral edge in contact with a first end contact surface of each valve to control movement of said valve between the closing position and the opening position;
- an actuator attached to the body to rotationally drive the plate;

wherein the peripheral edge of the plate has high edge portions and low edge portions connected by sloping portions, such that in the opening position of a valve of the plurality of valves, the first end contact surface of said valve is in contact with a first plate edge portion between a high edge portion and a low edge portion, and in the closing position of said valve, the first end contact surface of the valve is in contact with a second plate edge between a high edge portion and a low edge portion, the second edge being different from the first edge, the rotational drive of the plate moving the contact between the first end contact surface and the peripheral edge, from the first edge to the second edge or from the second edge to the first edge passing through a sloping portion.

By means of such a combination of characteristics, the mechanical components involved in the kinematic control chain of such a nozzle holder are isolated from a plant protection fluid circulating from a spray line to the spray heads. In addition, a user can freely and remotely control the active nozzle without manual intervention, thereby simplifying the actual operating time of the nozzle holder. Furthermore, the response time for moving a valve from the open position to the closed position or from the closed position to the open position is parameterizable not only by the speed of rotation transmitted by the actuator to the plate, but also by the slope portions of the peripheral edge of the plate. In other words, it is possible to change the performance of such a nozzle holder by changing the plate geometry, requiring only a single part to be changed among the entire nozzle holder to increase or reduce the time taken to switch from one position to another. Finally, in such a configuration, it is possible to switch from the opening position of a valve to a closing position of the valve and then again to an opening position of the valve without reversing the direction of rotation of the circular plate, alternating high edges and low edges.

Advantageously, in a given angular orientation of the plate relative to the body, several valves of the plurality of valves are in the opening position simultaneously, each first valve end contact surface being in contact with a single first edge of the plate. In such a configuration, a fluid circulating in the nozzle holder can thus be sprayed by a plurality of nozzles simultaneously.

Advantageously, each first edge portion extends circumferentially along a given circular sector. In particular, the circular sectors of each of the first edges may be different from each other, such that for a complete revolution of the plate, the contact between the first valve end contact surface is made mostly with the high edge portions or mostly with the low edge portions.

Advantageously, the nozzle holder comprises an even number of valves associated in twos, the associated valves being arranged symmetrically relative to a reference plane perpendicular to the plate, said plate comprising at least one given angular position for each pair of associated valves in a simultaneous opening position of said pair of valves.

Advantageously, the dispensing chamber is supplied by two branches of the inlet duct, each branch leading to the dispensing chamber on a different side of the reference plane. In such a configuration, each half of the plurality of valves is simultaneously supplied by the inlet duct, thereby increasing the fill flow rate of the nozzle holder. Furthermore, the separation of the inlet duct into two branches reduces the individual pressure losses of a fluid flow in the nozzle holder.

Advantageously, each valve further comprises a mechanical compression spring connecting the valve to walls of the dispensing chamber of the body; a second valve end configured to sealingly close the through ports of the dispensing chamber in the valve closing position, said second end further comprising sealing means. In this configuration, the mechanical spring enables the valve to be kept in the closing position.

Advantageously, the first contact end surface is carried by a tooth in contact with the peripheral edge of the plate. In such a configuration, any rotation on itself of a valve is blocked. Furthermore, the sliding of the tooth on the edge of the plate is facilitated, in particular on transitional zones, for example when the contact switches from a high portion to a sloping portion.

Advantageously, an axis of rotation of the actuator is offset radially relative to an axis of rotation of the plate. In such a configuration, a directional axis of the supply line can intersect the axis of rotation of the movable plate, which provides a better balance when attaching the nozzle holder to said supply line. In addition, the actuator, for example an electric stepper motor, can occupy a free volume depending on the desired motor power.

Advantageously, the actuator comprises a pinion forming a gear connection with a toothing of the plate. Thus, a reduction or a multiplication of the torque transmitted by the actuator to the plate is possible. The toothing of the plate occupies a circular sector greater than or equal to 120°.

Advantageously, the nozzle holder comprises at least one shutoff valve attached to the body to control the pressure of a liquid circulating in the inlet duct. The shutoff valve is preferably a solenoid shutoff valve. Still preferably, the solenoid valve controls the pressure of the fluid circulating in the inlet duct by means of pulse width modulated signals. Alternatively, the shutoff valve can be a mechanical or pneumatic drip stop.

According to another aspect of the invention, it relates to a device for attaching a nozzle holder to a fluid supply line, said device being configured to attach a nozzle holder comprising a body and a casing to a supply line, the supply line extending between the body of the nozzle holder and the casing of the nozzle holder, the attachment device comprising:

- at least one receiving support in cylindrical surface contact with the supply line;
- a receiving support hinge for pivoting a latch about a first pivot axis parallel to the direction of the supply line, the latch being movable between a closing position in which the latch surrounds the supply line on an outer periphery of the supply line and an opening position in which the contact between the receiving support and the supply line can be broken;
- a receiving support pin for locking the latch in the closing position by inserting into coaxial holes of the latch and the receiving support, the pin comprising an elastically deformable clamp collar in an undeformed initial shape, said pin being able to pivot about a second pivot axis parallel to the first pivot axis between a clamping position in which the clamp collar is elastically deformed to surround and clamp the outer periphery of the supply line by a ratchet and a free position in which the clamp collar is left free in its initial shape, the contact between the clamp collar and the supply line being broken;

the device being such that the clamp collar of the pin comprises an eccentric protruding radially relative to the direction of the supply line, the eccentric being configured to, in the clamping position of the pin, cover the latch and bear on a tab of the casing of the nozzle holder.

By means of such a combination of characteristics, such an attachment device makes it possible to both attach a nozzle holder to a fluid supply line while providing a function for attaching a casing to a nozzle holder comprising, for example, an actuator such as an electric stepper motor configured to supply mechanical energy to the nozzle holder. The attachment device also allows a nozzle holder architecture in which most of the mass of the casing is directly aligned with the supply line and the nozzle holder, thereby limiting the risk of the nozzle holder pivoting under the action of a moment generated by the weight of the casing.

Advantageously, the attachment device comprises a first receiving support located on one side of the nozzle holder and a second attachment support located on another side of the nozzle holder.

Advantageously, the hinges of the two receiving supports each pivot relative to a pivot axis located on either side of the supply line. In this configuration, each of the pins pivots in one direction of rotation, thereby preventing the risk of accidentally opening the attachment device and the nozzle holder falling off the supply line.

Advantageously, the clamp collar comprises a bent lug. The bent lug allows a user to exert sufficient pressure to ratchet the clamp collar onto the supply line or disengage the clamp collar to the free position of the pin.

Advantageously, each latch comprises a locking means in the closing position on the receiving support such that said locking means is retained by a stop of the receiving support when the attachment device is subjected to the weight of the nozzle holder. Such a locking means makes it easier to fit the nozzle holder on the supply line before assembling the casing with the body of the nozzle holder followed by inserting the pin and ratchetting the clamp collar onto the supply line.

BRIEF DESCRIPTION OF THE FIGURES

The invention will be better understood upon reading the following description, given solely as an example, and by referring to the accompanying figures, given as non-limiting examples, wherein identical references are given to similar objects and in which.

Figure 1:
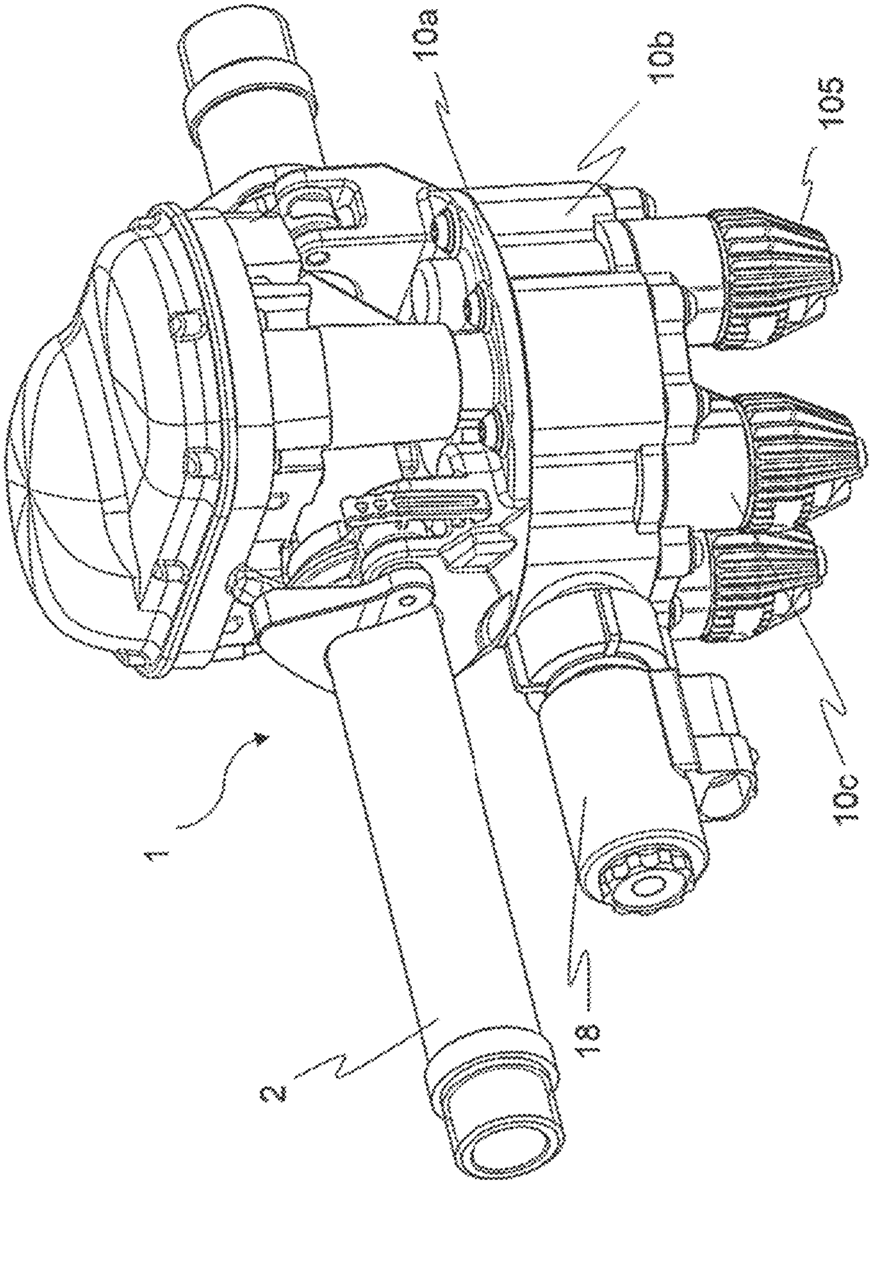
FIG. 1 is a schematic isometric perspective representation of a nozzle holder according to a first embodiment of the invention.
Figure 2A:
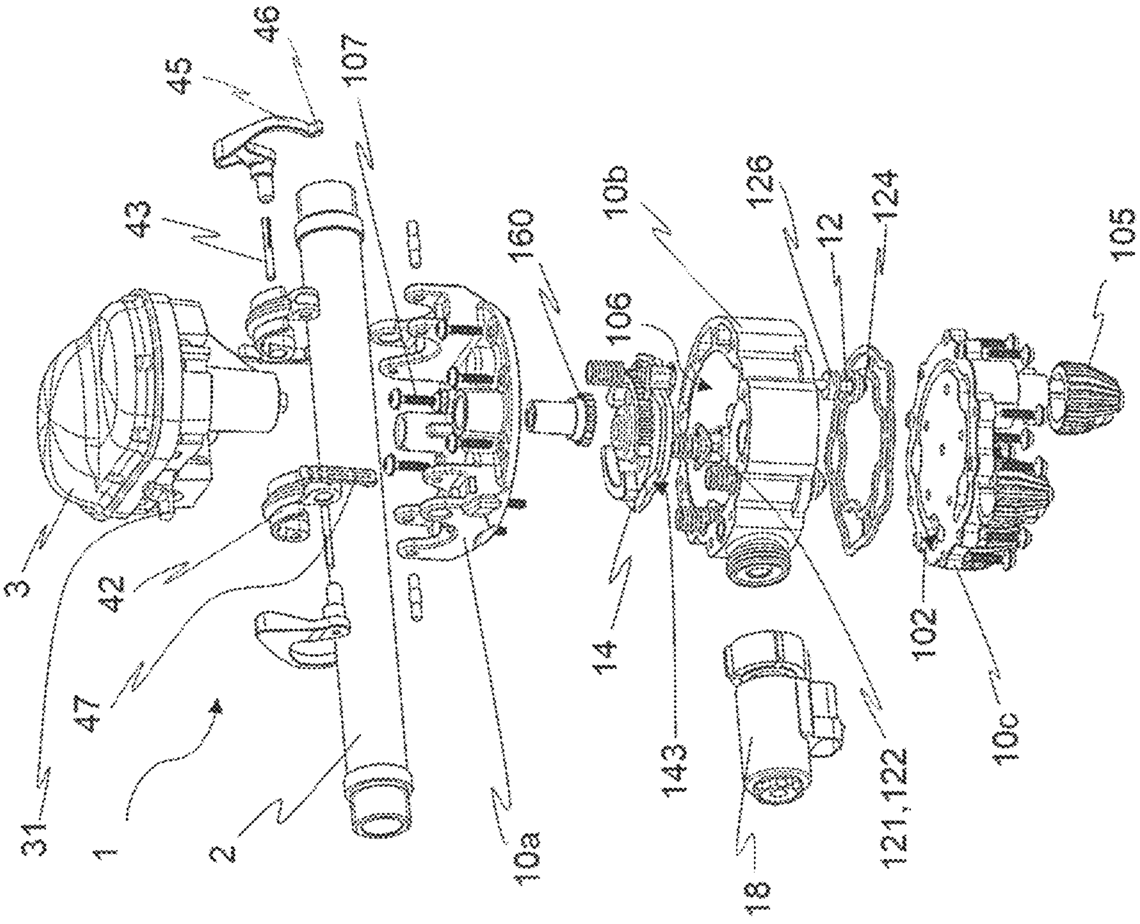
FIG. 2A is a schematic exploded isometric perspective representation of FIG. 1.
Figure 2B:
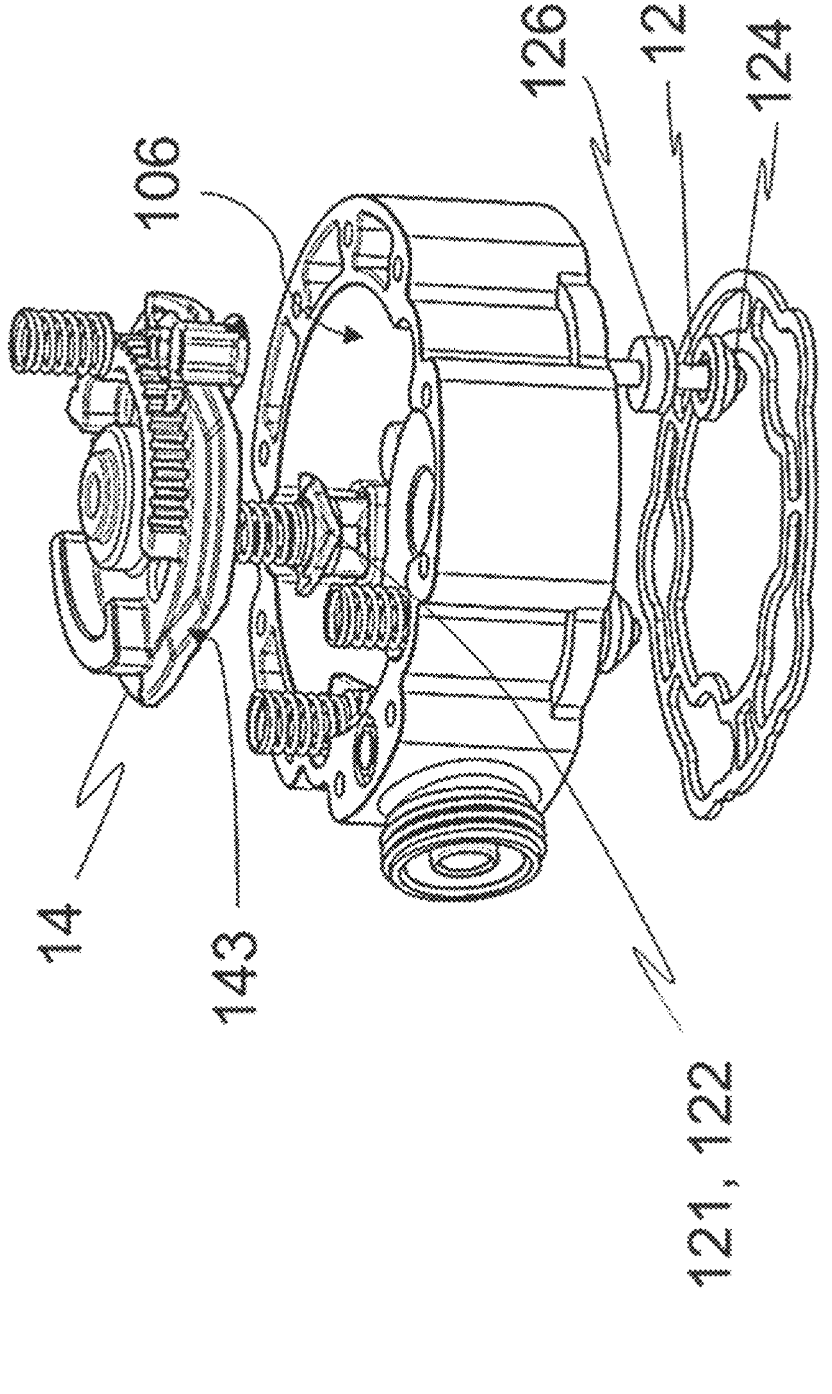
FIG. 2B is a schematic exploded perspective representation of the intermediate body part of FIG. 2A.
Figure 3:
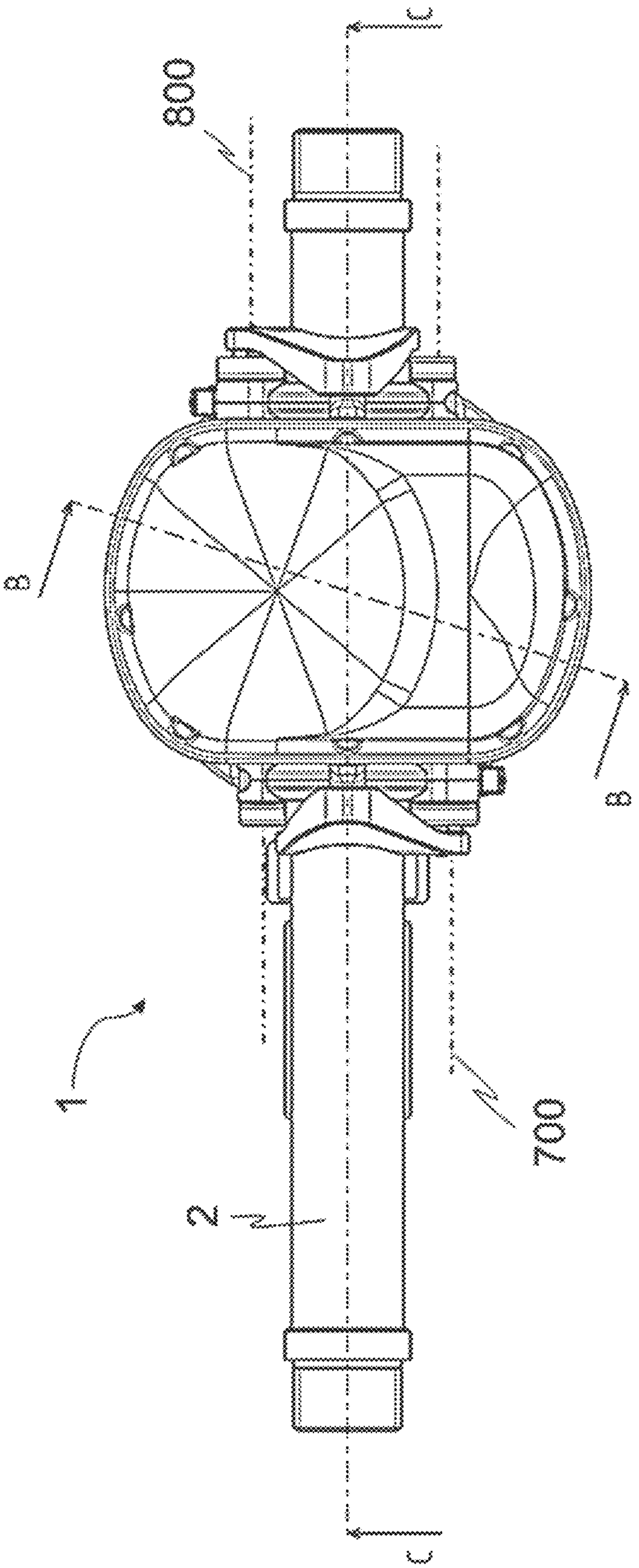
FIG. 3 is a schematic top view representation of FIG. 1.
Figure 4A:
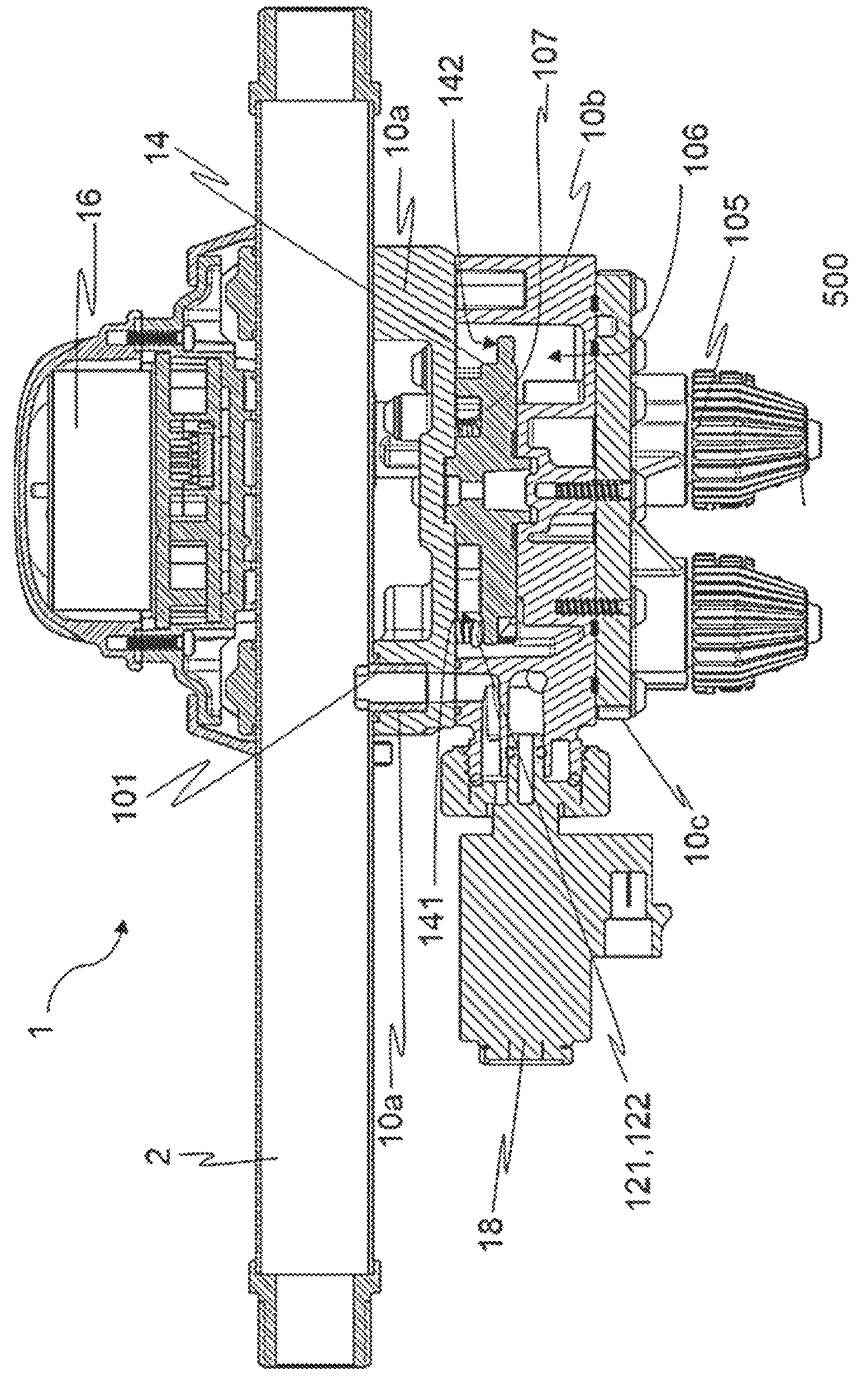
FIG. 4A is a schematic cross-sectional representation along a direction C-C of FIG. 3.
Figure 4B:
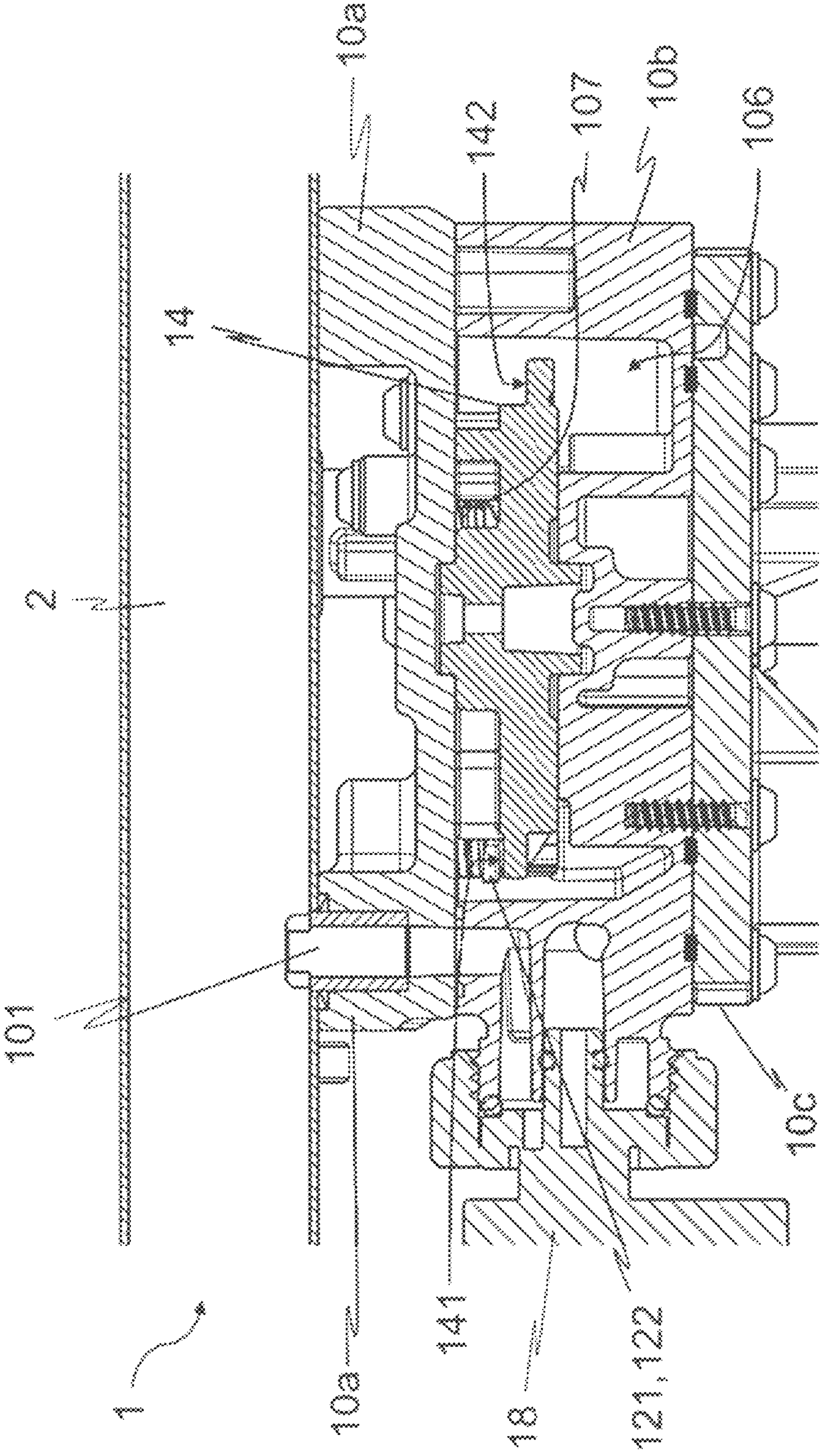
FIG. 4B is a schematic enlarged cross-sectional representation of the supply line and upper body part of FIG. 4A.

It should be noted that the figures set out the invention in detail in order to enable the implementation of the invention; although non limiting, said figures are especially used to better define the invention where applicable.

DETAILED DESCRIPTION OF THE INVENTION

FIGS. 1 to 5 illustrate a nozzle holder 1 configured to be part of a spray system. The nozzle holder 1 is intended to be attached to a supply line 2 and for example to be carried or towed by a vehicle, in particular an agricultural machine. The nozzle holder 1 comprises a body, especially prismatic, which has the function of housing the various components of the nozzle holder 1. The body is preferably formed from an upper body part 10*a*, an intermediate body part 10*b* and a lower body part 10*c*. The upper part 10*a* is attached to the supply line 2 and integral with the intermediate body part 10*b*. The lower body part 10*c* is integral with the intermediate body part 10*b*. The body parts 10*a*, 10*b* and 10*c* are secured by attachment means, for example by screws, distributed over the periphery of the body parts 10*a*, 10*b* and 10*c*.

The body comprises an inlet duct 101 for liquid, for example plant protection liquid. The inlet duct 101 extends through the upper body part 10*a* and through the intermediate body part 10*b* to connect the supply line 2 to a shutoff valve 18 to control the pressure of the liquid circulating in the inlet duct 101. The shutoff valve 18 is preferably a solenoid valve 18, attached to the intermediate body part 10*b*. The solenoid valve 18 allows the pressure of the fluid circulating in the inlet duct to be controlled by means of pulse-width modulated signals, for example from the control of a driver from the agricultural machine cab.

The inlet duct 101 leads to a dispensing chamber 102, located in the lower part of the body 10*c*. The dispensing chamber 102 is supplied with liquid by the inlet duct 101. The dispensing chamber 102 extends at the periphery of the lower body part 10*c*. The dispensing chamber communicates with a plurality of outlet ducts 104, here four in number. The interfaces between the dispensing chamber 102 and each of the fluid outlet ducts delimit liquid through ports 103, also four in number. The fluid outlet ducts 104 extend into the lower body part 10*c* and lead into spray heads 105. To ensure sealing of the dispensing chamber 102, a seal, for example an elastomeric seal, is interposed between the intermediate body part 10*b* and the lower body part 10*c*.

The assembly of the upper body part 10*a* and the intermediate body part 10*b* delimits a compartment 106 intended to house movable mechanical elements of the nozzle holder 1. The compartment 106 comprises a plate 14 rotationally movable relative to the intermediate body part 10*b* and the upper body part 10*a*. The connection between the body and the plate 14 is a pivot connection about an axis of rotation of the plate 500, the axis of rotation of the plate 500 being parallel to an axis of alignment in the assembled position of the body parts 10*a*, 10*b*, 10*c*. The pivot connection between the body and the plate 14 is preferably ensured by two lubricated plain bearings located at a central part of the plate 14, one of the plain bearings ensuring rotational guidance relative to the upper body part 10*a* and the other of the plain bearings ensuring rotational guidance relative to the intermediate body part 10*b*. Furthermore, the plate 14 is axially stopped on the one hand by a shoulder bearing on the upper body part 10*a* and on the other hand by a shoulder bearing on the intermediate body part 10*b*. Alternatively, the pivot connection can be ensured by race rings, for example ball or roller race rings.

The plate 14 has a cylindrical shape, a thickness of the plate 14 being substantially less than a radius of the plate 14. A peripheral edge of the plate 14 has high edge portions 141 and low edge portions 142 connected by sloping portions 143. The low edges 142 are axially closer to the intermediate body part 10*b* and the high edges 141 are axially closer to the upper body part 10*a*. The sloping edge portions 143 connect the high edges and the low edges such that the edge of the plate 14 is continuous. The plate 14 further comprises a toothing 144 to form a gear connection with a pinion 160 of an actuator 16 intended to rotationally drive the plate 14. The actuator 16 is, for example, an electric stepper motor, but may alternatively be a pneumatic or mechanical actuator. An axis of rotation 600 of the actuator 16 is offset radially relative to the axis of rotation 500 of the plate 14. Advantageously, the gear connection between the pinion 160 and the toothing 144 generates a multiplication or reduction of the torque transmitted by the actuator 16 to the plate 14. The toothing 144 of the plate 14 occupies a circular sector, advantageously but not non limited to, greater than or equal to 120°. Advantageously, a stop screw 107 is offset radially towards the toothing 144 to be used as an end stop for the rotation of the plate 14. Furthermore, the screw 107 allows an origin to the angular orientation of the plate 14 to be defined, especially for the actuator 16, which corresponds to the stop position of the toothing 144 against the stop screw 107.

The nozzle holder 1 comprises a plurality of valves 12 partially arranged in the dispensing chamber 102, each of the valves 12 being movable between a sealed closing position of the corresponding liquid through port 103 of the dispensing chamber and an opening position of said through port. Here, the valves 12 are four in number but the number of valves may be different depending on the chosen embodiment. Each of the valves 12 comprises a first contact end surface 121 carried by a tooth 122 in contact with the peripheral edge of the plate 14. The valves 12 are connected to the upper body part 10*a* by mechanical springs 123 and extend through the compartment 106 to the dispensing chamber 102. Here, the mechanical springs 123 are compression springs for maintaining contact between a second end 124 of the valve 12 and the liquid through ports 103 in the closing position of the valves 12. The second valve end 124 further comprises scaling means 125 intended to cooperate with the liquid through ports 103 to ensure sealing. The sealing means 125 are, for example, elastomer seals or circlips. The valves 12 may further comprise additional sealing means 126, especially for parts of each of the valves extending between the compartment 106 and the dispensing chamber 102.

The description here focuses on the operation of the nozzle holder 1. The supply line 2 supplies liquid, for example plant protection liquid, to the inlet duct 101 towards the inlet chamber 102, through the solenoid valve 18 modulating the pressure and flow rate of the fluid entering the inlet chamber 102. As the valves 12 are initially in the closing position, the inlet chamber 102 can thus be filled with liquid. In the closing position of the valves 12, the teeth 122 of the valves 12 are each in contact with a low portion 142 of the plate 14. By a control of the actuator 16, the movable plate 14 is rotationally driven about the axis of rotation of the plate 500. The contact between the teeth 122 and the peripheral edge of the plate 14 then moves along the sloping portions 143, to reach the high edges 141 in the opening position of the valves 12. The second valve ends 124 then release the liquid through ports 103. The liquid contained in the dispensing chamber 102 then flows to the liquid outlet ducts 104 and can be sprayed via the spray heads 105 to the outside of the nozzle holder 1.

The consequence of such a nozzle holder 1 architecture and its operation lies in the fact that the path taken by a fluid flow avoids passing through the compartment 106 in which the movable elements of the nozzle holder are located, from the inlet to the outlet of the fluid.

Thus, each high edge 141 and each low edge 142 extend circumferentially along a given circular sector. The circular sectors of each of the high edges 141 and each of the low edges 142 may be different.

In the described embodiment, it is therefore possible to configure the circular sectors of each edge such that for a nozzle holder, one to four valves 12, with a total of six different angular positions of the plate 14, results in six possible opening or closing configurations of the four valves. Thus, the first four angular positions correspond to a closing position of three of the valves 12 and an opening position of the last valve 12, the valve 12 in the closing position being different for each of the first four angular positions of the plate 14. The remaining two angular positions correspond to configurations where two of the four valves 12 are in the opening position and the other two valves 12 are in the closing position, with the two valves 12 in the closing position and the two valves 12 in the opening position being different for each of the remaining two angular positions. The nozzle holder 1 can thus spray liquid continuously through several spray heads 105 simultaneously.

Figure 5:
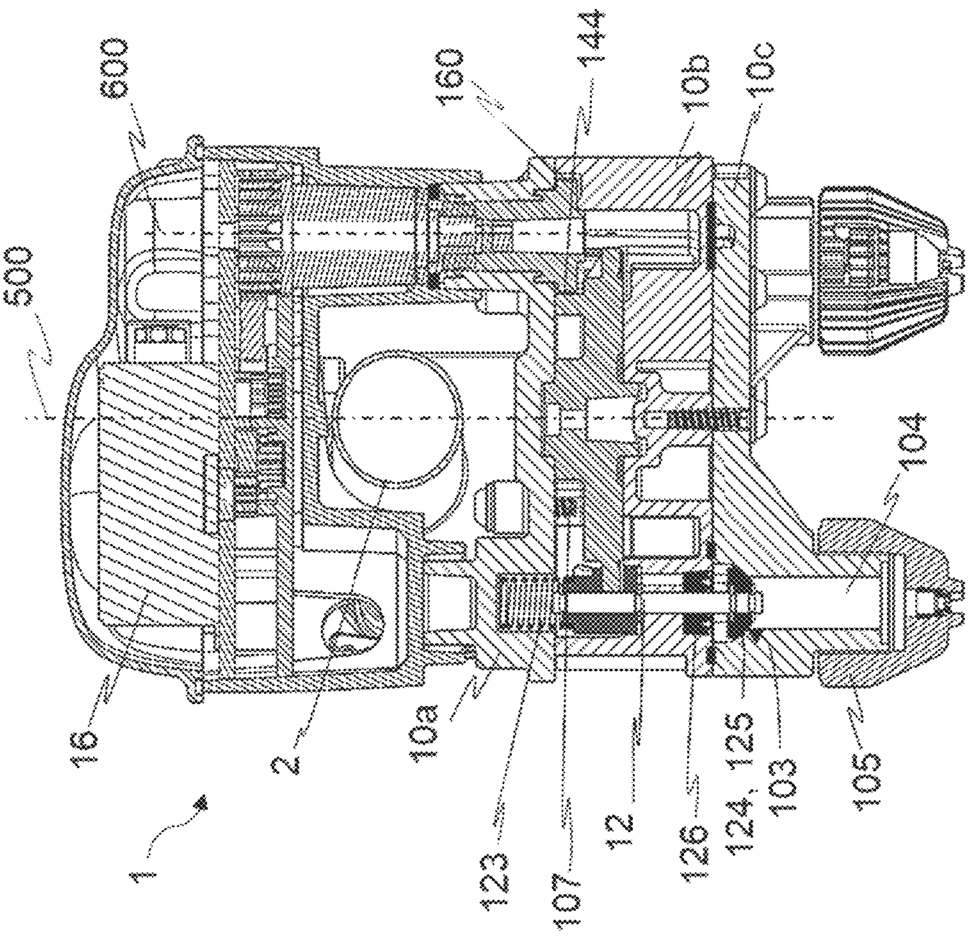
FIG. 5 is a schematic cross-sectional representation along a direction B-B of FIG. 3.
Figure 6:
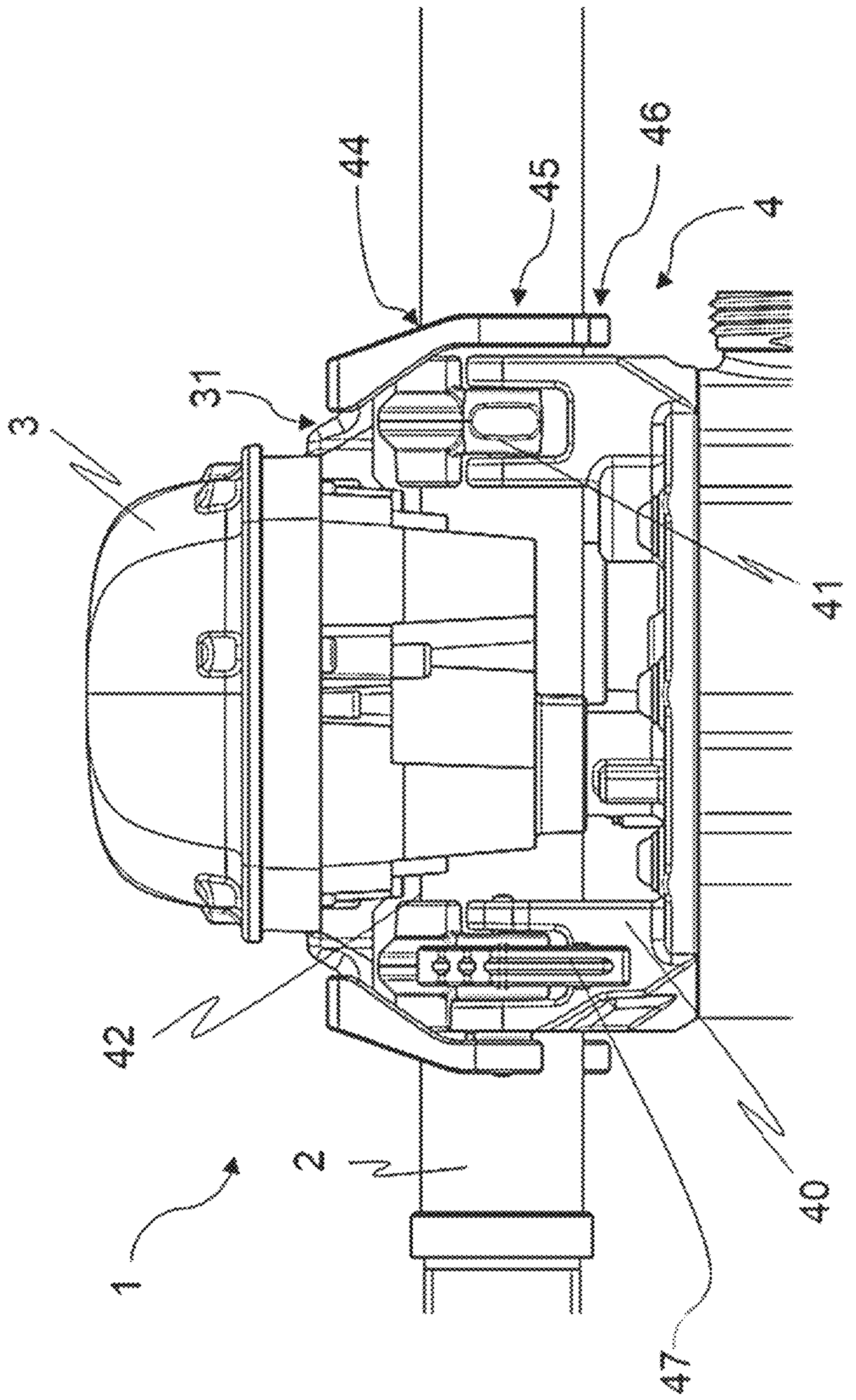
FIG. 6 is a schematic front view representation of a particular detail region of FIG. 1 according to another aspect of the invention.
Figure 7:
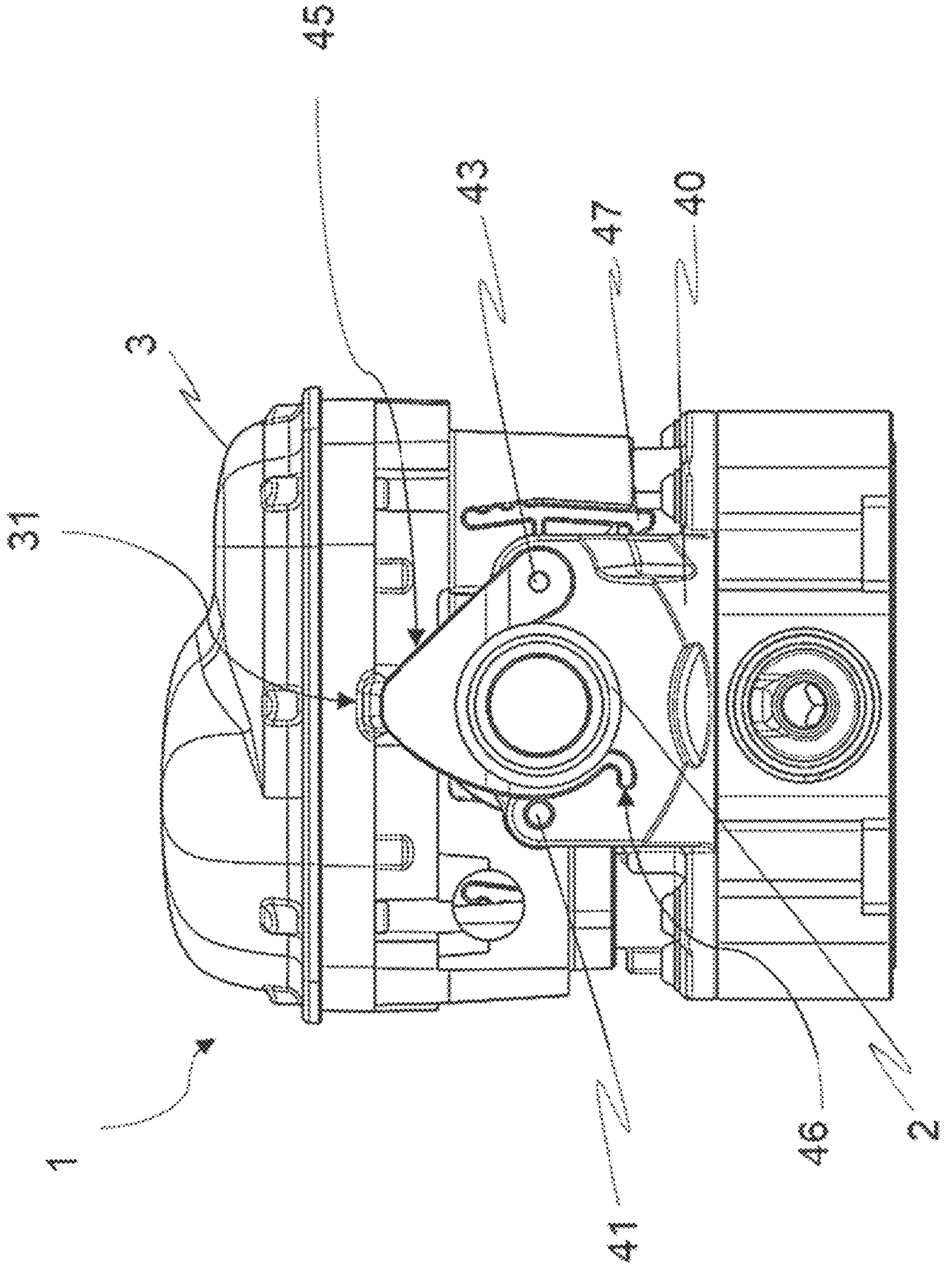
FIG. 7 is a schematic left view representation of a detail of FIG. 1 according to another aspect of the invention.
Figure 8A:
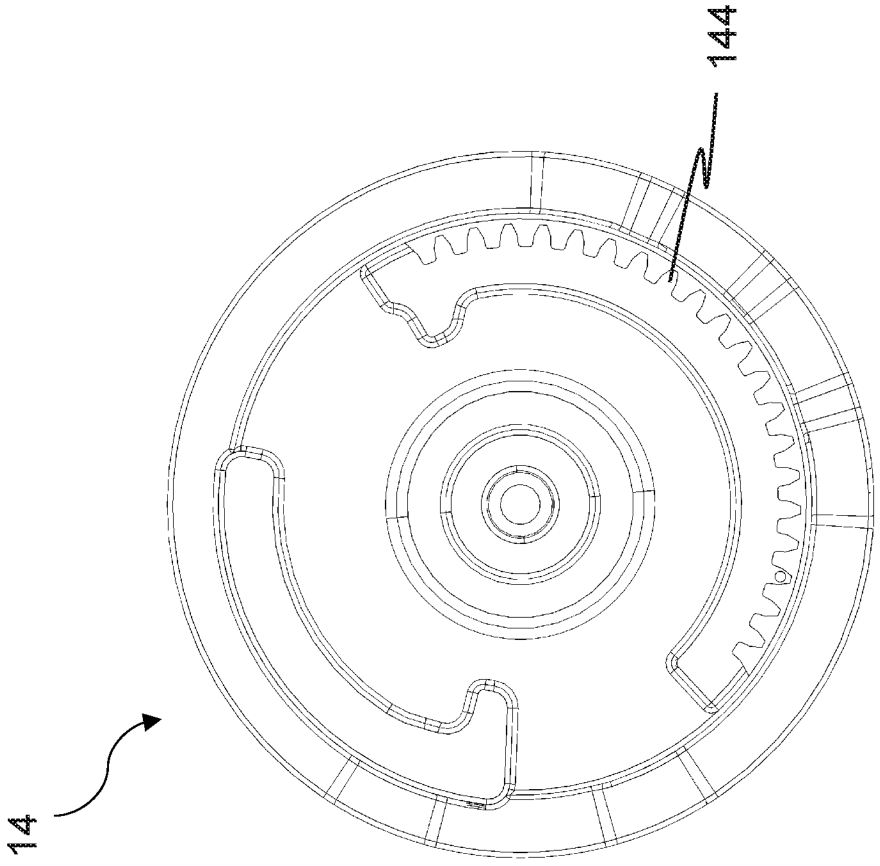
FIG. 8A is a schematic top view representation of a movable plate shown for the nozzle holder of FIGS. 2A and 2B.
Figure 8B:
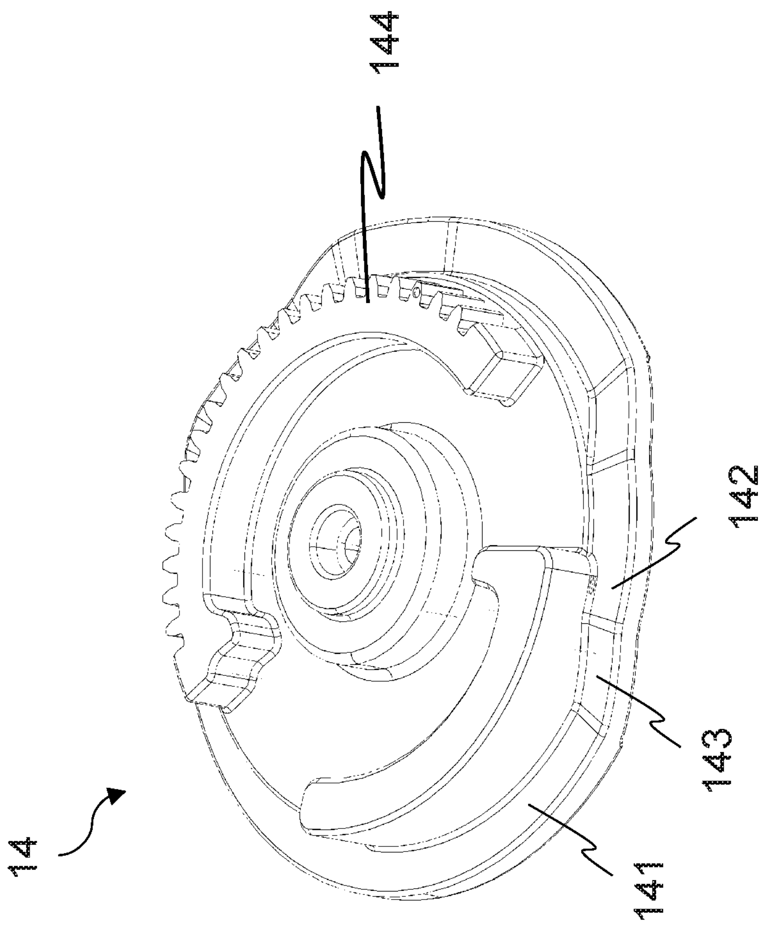
FIG. 8B is a schematic perspective representation of the movable plate of FIG. 8A.
Figure 9:
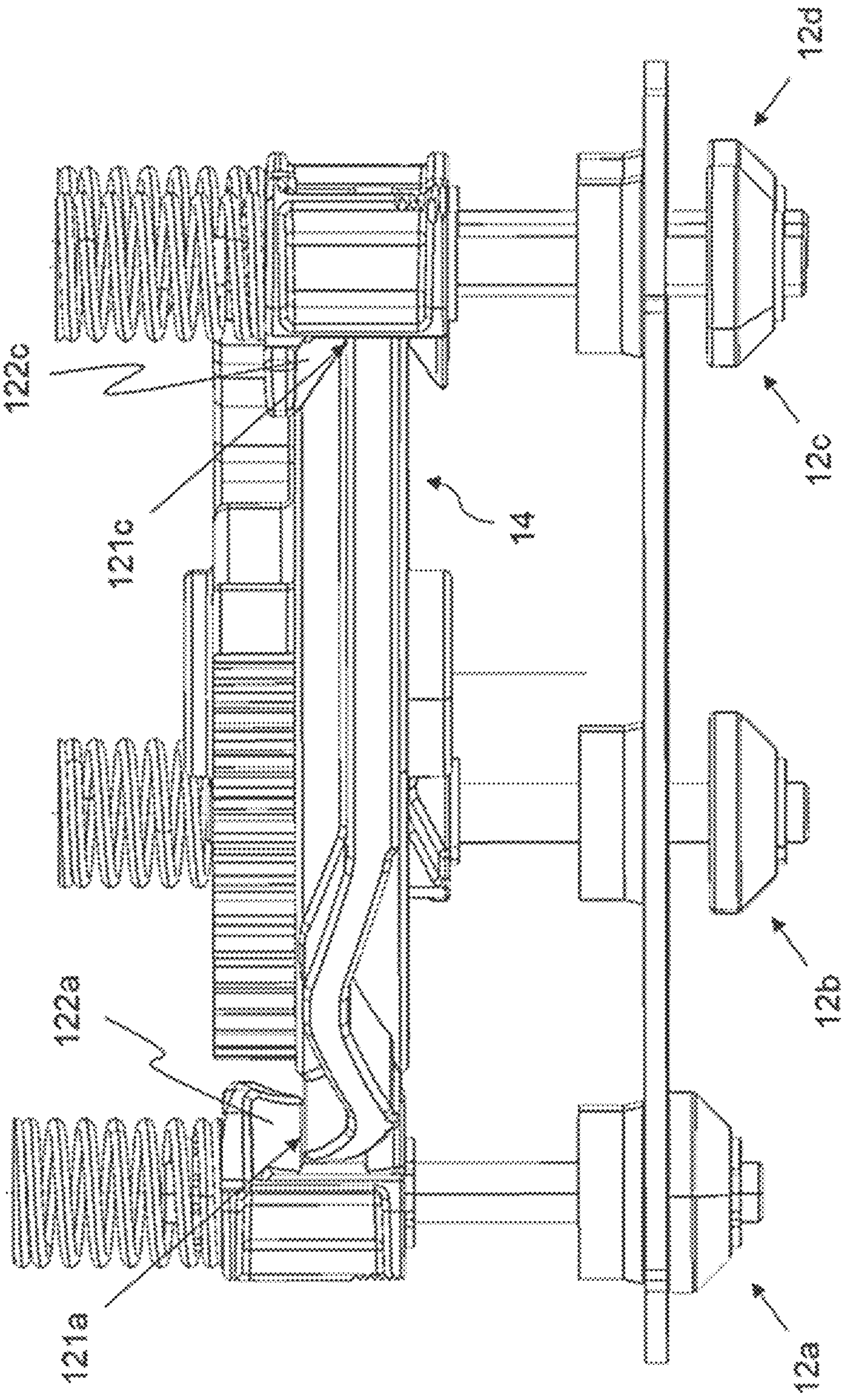
FIG. 9 is a schematic side elevation representation of the movable plate and valves FIGS. 2A and 2B.
Figure 10:
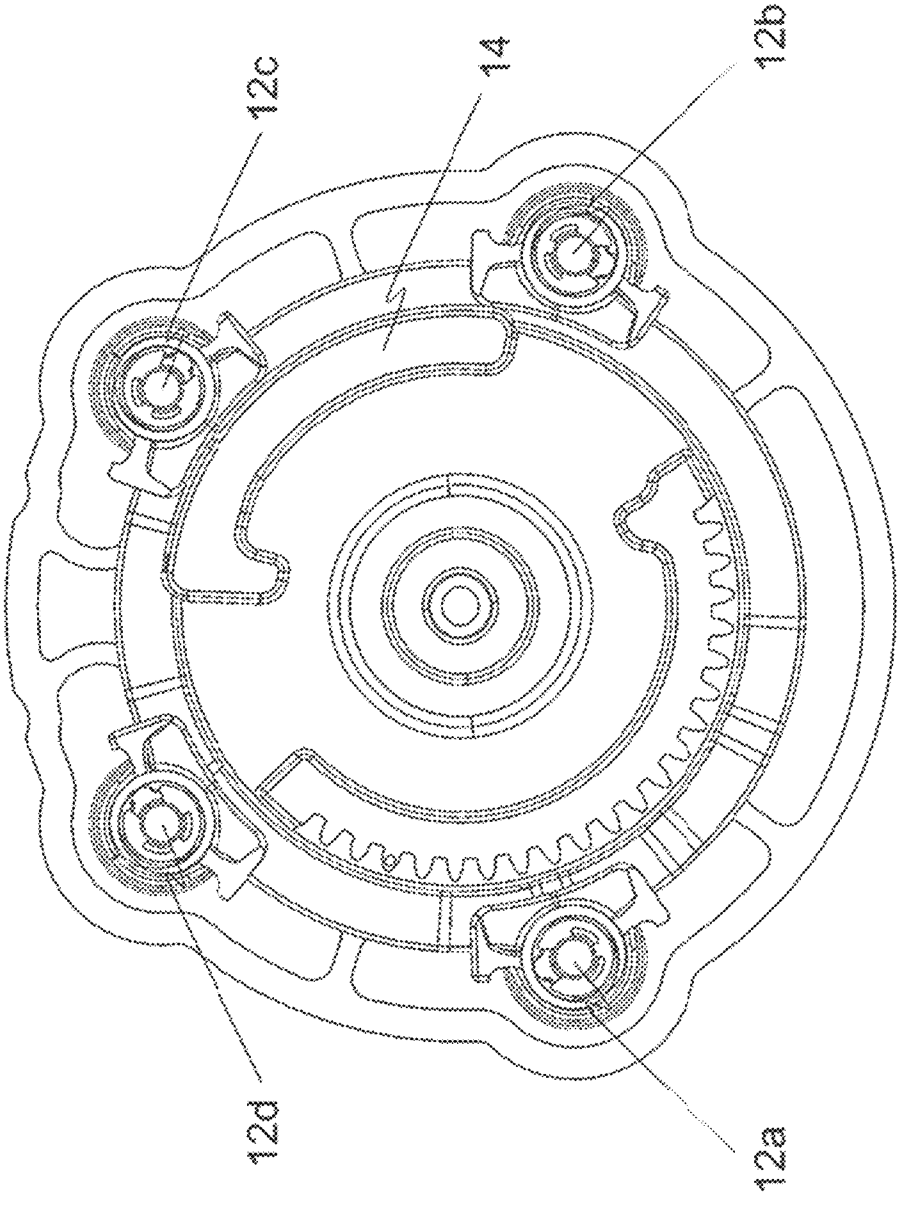
FIG. 10 is a schematic top view representation of movable plate of FIGS. 2A and 2B.
Figure 11:
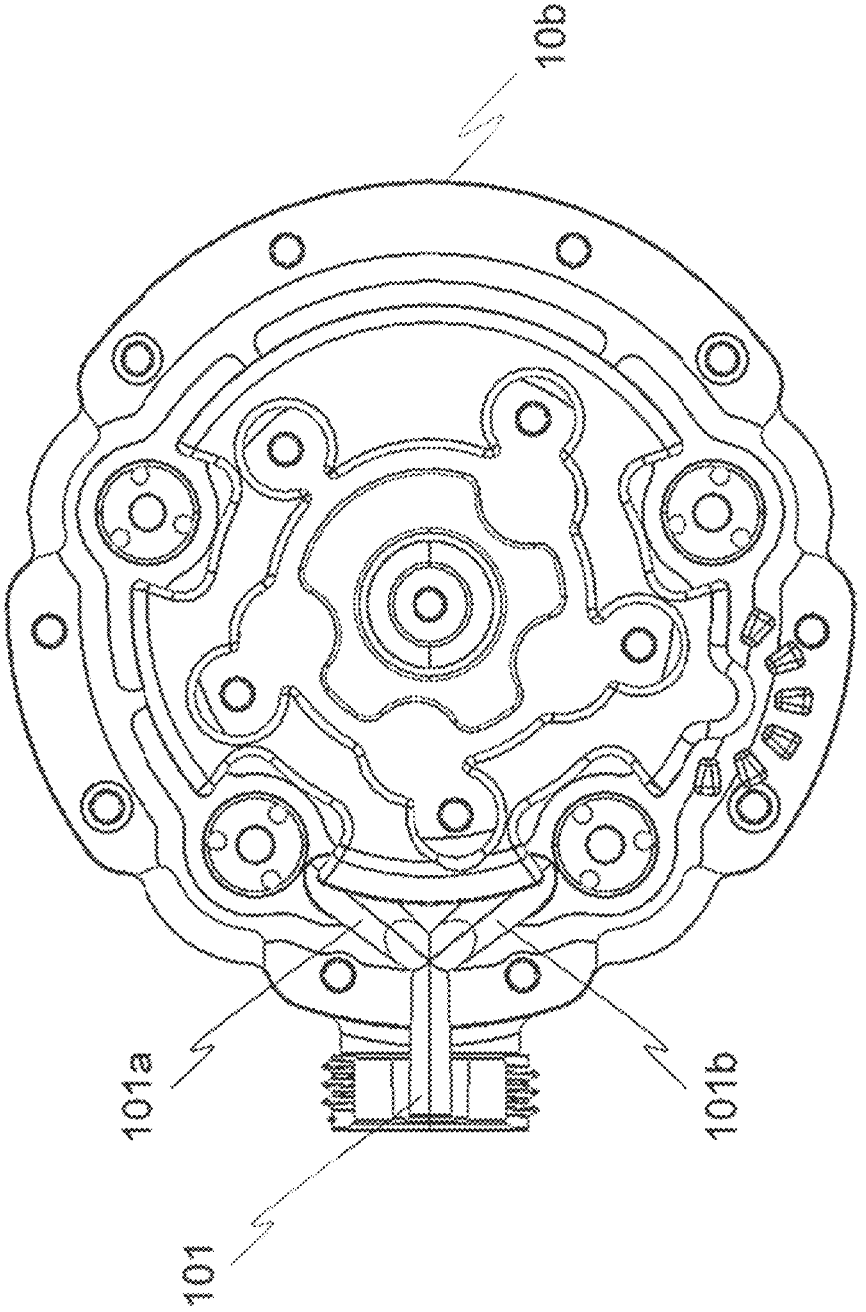
FIG. 11 is a schematic top view representation of the intermediate body part of FIGS. 2A and 2B.
Figure 12:
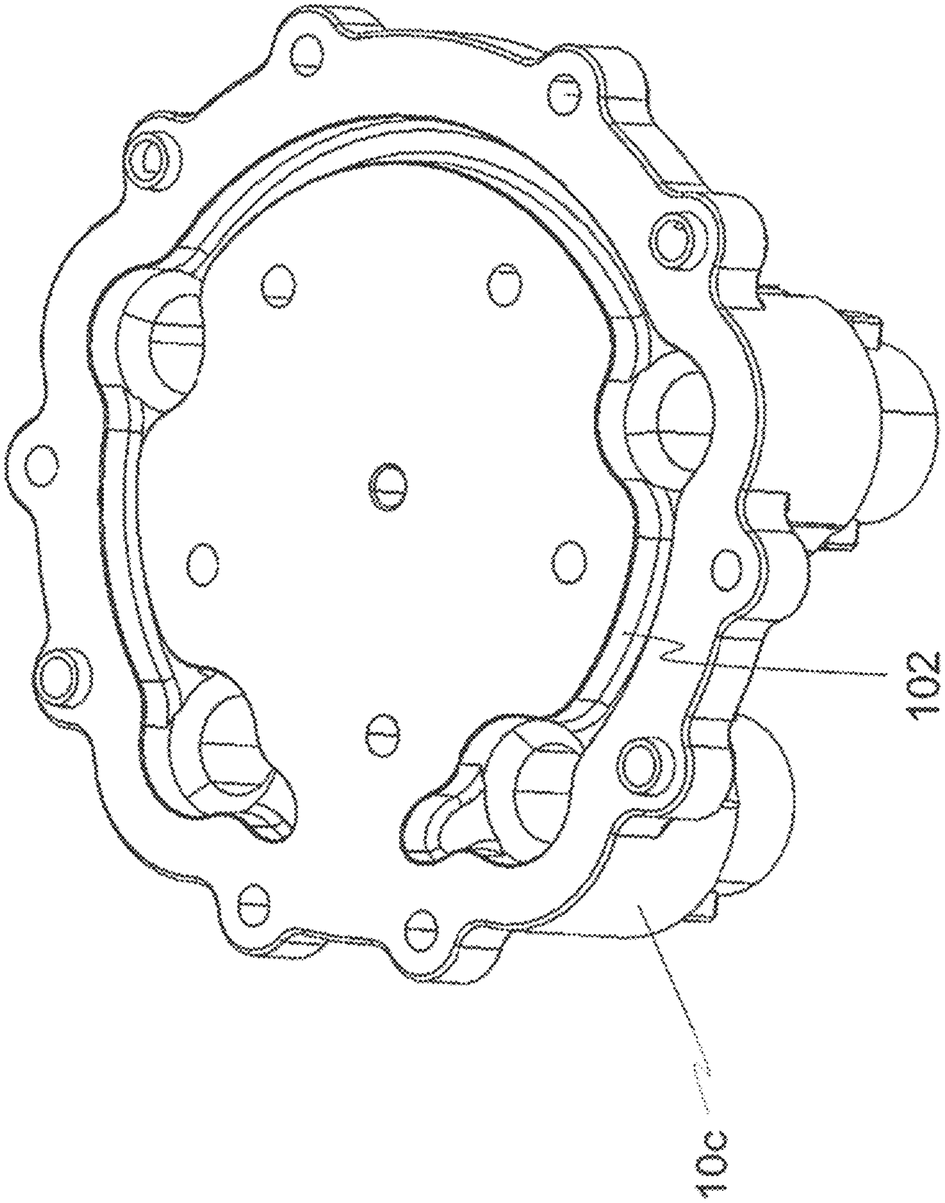
FIG. 12 is a schematic top view representation of the lower body part of FIGS. 2A and 2B.

FIGS. 5 to 7 illustrate a nozzle holder 1 according to another aspect of the invention, relating to the attachment of the nozzle holder 1 to the supply line 2 by an attachment device 4.

The upper body part 10*a* carries two receiving supports 40 of the attachment device 4, in cylindrical surface contact with the supply line 2. Each of the two receiving supports 40 comprises a hinge 41 allowing a latch 42 to pivot about a pivot axis, 700, 800, in parallel to the direction of the supply line, the latch 42 being movable between an opening position in which the contact between the receiving support 40 and the supply line 2 can be broken and a closing position in which the latch 42 surrounds the power line 2 on an outer line periphery to maintain contact between the receiving support 4 and the supply line 2. In the closing position, the latch 42 is locked through a pin 43 that inserts into coaxial holes of the receiving support 4 and the latch 42. In the described embodiment, each of the latches 42 pivots in different directions of rotation and the pivot axes 700, 800 are on either side of the supply line 2.

The actuator 16 is housed in a casing 3 attached to the upper body part 10*a* such that the supply line 2 partially extends between the casing 3 and the upper body part 10*a*. The casing 3 further comprises two tabs 31 extending protruding in parallel to the direction of the supply line 2, opposite and away from the latches 42 in the closing position of the latches. Each of the pins 43 further comprises an elastically deformable clamp collar 44 in an undeformed initial shape. The pin 43 can pivot about the pivot axis 700, 800 of the hinge of the other receiving support. The pin 43 thus pivots between a clamping position in which the clamp collar 44 is elastically deformed to surround and clamp the outer periphery of the supply line 2 by a ratchet and a free position in which the clamp collar 44 is left free in its initial shape and the contact between the clamp collar 44 and the supply line 2 is broken.

The clamp collar 44 comprises an eccentric 45 protruding radially in relation to the direction of the supply line 2. The eccentric 45 in the clamping position of the pin 43 bears and exerts a stress on the tab of the casing 3. In such a configuration, the pin 43 in the clamping position makes it possible to attach the nozzle holder 1 to the supply line 2, but also to keep the casing 3 integral with the upper body part 10*a*, thereby ensuring the flow of a liquid from the supply line 2 to the inlet duct 101.

The clamp collar 44 comprises a bent lug 46. The bent lug 46 allows a user to exert sufficient pressure to ratchet the clamp collar 44 onto the supply line 2 or to disengage the clamp collar 44 to the free position of the pin 43.

It should also be noted that the invention is not limited to the embodiments described previously. Indeed, it will appear to those skilled in the art that various modifications may be made to the embodiment described above, in the light of the teaching that has just been disclosed thereto.

For example, the nozzle holder may comprise an even number of valves 12, other than four, the valves 12 being associated in twos. The associated valves 12 are arranged symmetrically relative to a reference plane perpendicular to the plate 14. The plate 14 can be oriented in at least one given angular position for each pair of associated valves 12 in a simultaneous opening position of said pair of valves 12. Alternatively, the nozzle holder may contain an odd number of valves 12, the valves 12 may then be associated differently.

Alternatively, the nozzle holder 1 can comprise a second shutoff valve, preferably arranged, for example, symmetrically on the intermediate body part 10*b* relative to the first shutoff valve.

In the detailed presentation of the invention that is made previously, the terms used should not be interpreted as limiting the invention to the embodiment set out in the present description, but should be interpreted to comprise all equivalents that are within the reach of the person skilled in the art by applying his general knowledge to the implementation of the teaching that has just been disclosed to him.

The invention claimed is:

1. A nozzle holder, especially for an agricultural sprayer, comprising:

a body housing a liquid inlet duct configured to be supplied with liquid by a liquid supply line;

a peripheral dispensing chamber of the body supplied with liquid by the liquid inlet duct and communicating with a plurality of liquid outlet ducts, a respective interface between the peripheral dispensing chamber and each of the liquid outlet ducts delimiting respective liquid through ports of the peripheral dispensing chamber, each of said liquid outlet ducts leading from a respective liquid through port to a respective spray head;

a plurality of valves partially arranged in the peripheral dispensing chamber, each valve of said plurality of valves being movable between a sealed closing position of a respective liquid through port of the peripheral dispensing chamber and an opening position of the respective liquid through port of the peripheral dispensing chamber;

a circular plate having a peripheral edge and an axis of rotation, the circular plate rotationally movable relative to the body and housed in a mechanism compartment of the body, the peripheral edge in contact with a respective first end contact surface of each valve to control axial movement of each valve between the sealed closing position and the opening position, the axial movement with respect to the axis of rotation; each of the liquid outlet ducts extending axially to the respective spray head;

an actuator attached to the body to rotationally drive the circular plate;

the peripheral edge of the circular plate having axially high edge portions and axially low edge portions connected by sloping portions, such that in the opening position of each valve of the plurality of valves, the respective first end contact surface of the valve is in contact with a first plate edge portion among the axially high edge portions and the axially low edge portions, and in the sealed closing position of each valve of the plurality of valves, the respective first end contact surface of the valve is in contact with a second plate edge portion among the axially high edge portions and the axially low edge portions, the second plate edge portion being opposite in axial height from the first plate edge portion;

a rotational drive of the circular plate moving contact between the respective first end contact surface of each valve of the plurality of valves and the peripheral edge, wherein the respective first end contact surface contacts the peripheral edge during rotation of the circular plate in the order of the first plate edge portion, a sloping portion, and the second plate edge portion, or in the order of the second plate edge portion, the sloping portion, and the first plate edge portion.

2. The nozzle holder according to claim 1, wherein in a given angular orientation of the circular plate relative to the body, several valves of the plurality of valves are in the opening position simultaneously, the respective first end contact surface of each valve of the several valves being in contact with a single first plate edge portion of the circular plate.

3. The nozzle holder according to claim 1, wherein the first plate edge portion extends circumferentially along a given circular sector.

4. The nozzle holder according to claim 1, wherein the nozzle holder comprises an even number of the plurality of valves associated in pairs, the associated valves being arranged symmetrically relative to a reference plane perpendicular to the circular plate, said circular plate comprising at least one given angular position for a pair of associated valves in a simultaneous opening position of said pair of associated valves.

5. The nozzle holder according to claim 4, wherein the peripheral dispensing chamber is supplied by two branches of the liquid inlet duct, each branch leading to the peripheral dispensing chamber on a different side of the reference plane.

6. The nozzle holder according to claim 1, wherein each valve of the plurality of valves further comprises a mechanical compression spring connecting the valve to walls of the peripheral dispensing chamber of the body; a second valve end of each valve of the plurality of valves configured to sealingly close the respective liquid through port of the peripheral dispensing chamber in the sealed closing position of the valve, said second valve end of each valve of the plurality of valves further comprising a sealing means.

7. The nozzle holder according to claim 6, wherein the first contact end surface of each valve of the plurality of valves is carried by a tooth in contact with the peripheral edge of the circular plate.

8. The nozzle holder according to claim 1, wherein an axis of rotation of the actuator is offset radially relative to the axis of rotation of the circular plate.

9. The nozzle holder according to claim 1, wherein the actuator comprises a pinion forming a gear connection with a toothing of the circular plate.

10. The nozzle holder according to claim 1, wherein the nozzle holder comprises at least one shutoff valve attached to the body to control the pressure of a liquid circulating in the liquid inlet duct.

* * * * *